United States Patent
Hoydic

[11] 3,807,852
[45] Apr. 30, 1974

[54] FORMS WHICH ARE INTENDED TO BE REPRODUCED ON A COPYING MACHINE

[75] Inventor: Frank Hoydic, Whittier, Calif.
[73] Assignee: Unitax, Inc., Whittier, Calif.
[22] Filed: Jan. 15, 1973
[21] Appl. No.: 323,813

[52] U.S. Cl. .................................. 355/7, 355/133
[51] Int. Cl. ............................................ G03g 15/04
[58] Field of Search ............................ 355/3, 7, 133

[56] References Cited
UNITED STATES PATENTS

| | | | |
|---|---|---|---|
| 3,597,082 | 8/1971 | James et al. | 355/133 |
| 2,446,915 | 8/1948 | Filmer | 96/35 |
| 3,324,764 | 6/1967 | Altman | 355/7 |
| 3,603,681 | 9/1971 | Bertolotti | 355/17 |

Primary Examiner—John M. Horan

[57] ABSTRACT

A business record form such as a work sheet to be used in conjunction with the preparation of tax returns which is intended to be reproduced on a copying machine can contain areas destined to carry information to be reproduced and other areas destined to carry information which is not to be reproduced. Such other areas on a side or surface of the form are covered with a means--normally a printed pattern--which will not obscure from visual inspection written information applied to the form in a normal manner such as through the use of a pen, a pencil or a typewriter, but will obscure such information on a reproduction of the form made using a copying machine. When the form is intended to be copied using a Xerographic type of copying machine, these other areas are normally covered with a yellow-orange pattern.

1 Claim, 2 Drawing Figures

PATENTED APR 30 1974    3,807,852

FORMS WHICH ARE INTENDED TO BE REPRODUCED ON A COPYING MACHINE

BACKGROUND OF THE INVENTION

The invention set forth in this specification pertains to business record forms. Such forms are widely used for a number of different purposes. In some uses of such forms it is desired that the originals of such forms carry two types of information—information which is intended to be reproduced from such forms and information which is not intended to be reproduced from such forms.

This can be illustrated by referring to forms such as are commonly used in the preparation of tax returns. In certain of such forms individual accountants enter figures showing computations as are required in determining tax liability. Such forms are processed and from them tax returns are prepared. In order to save duplication of work it is desirable to reproduce such forms so that copies of them can be directly attached to tax returns.

However, when such returns contain both information directly received from a taxpayer as well as preliminary calculations relative to tax liability the direct use of copies of such forms with tax returns is disadvantageous. Such useage is disadvantageous inasmuch as on occasion the preliminary calculations entered on such forms are inaccurate. Obviously such inaccurate calculations should not be submitted with a tax return which is otherwise accurate.

One way of avoiding this problem would be to utilize forms as indicated in conjunction with preprinted copies of such forms in which the areas to contain calculations are obscured by a printed pattern or the like so that on the copy of a form as indicated calculations which might be erroneous would not be visible. When such a form and copy are used either the copy must be of a special paper which will show an image in response to the application of pressure or a sheet of carbon paper must be used. This approach is considered disadvantageous because it requires two printed forms the original without printed over areas and a second sheet with printed over areas and because it requires the use of a separate sheet of carbon paper or the use of pressure sensitive paper.

From this it is believed that it will be apparent that there is a need for new and improved forms and more specifically business record forms which contain areas which are destined to carry information to be reproduced and other areas which are destined to carry information which is not to be reproduced. More specifically there is a need for forms of this type which can be reproduced with a minimum of difficulty at a comparatively nominal cost utilizing present-day effective, inexpensive copying machines.

SUMMARY OF THE INVENTION

A broad objective of the present invention is to provide forms as indicated which fulfill this need. More specifically this invention is designed to provide business record forms such as forms used in connection with the preparation of tax returns which are intended to be reproduced on a copying machine and which contain areas destined to carry information to be reproduced and other areas destined to carry information which are not to be reproduced. A further objective of the present invention is to provide forms as indicated which are comparatively inexpensive and which can be easily and conveniently used with common copying machines.

In accordance with this invention these objectives are achieved in a form as indicated which is divided into areas as discussed in the preceding. The "other" areas noted which are designed to carry information which is not to be reproduced are covered with a means for permitting any information entered on them to be visually inspected and for obscuring such information when these forms are copied. The preferred forms in accordance with this invention are intended to be used with Xerographic type copying machines and preferably such "other" areas are covered with a pattern of yellow-orange colored ink.

BRIEF DESCRIPTION OF THE DRAWING

The invention is best more fully explained with reference to the accompanying drawing in which.

It will be realized that the features of this invention can be applied in various ways to various different forms which are intended to be reproduced on different copying machines. Because of this the invention is to be considered as being limited solely by the appended claims forming a part of this disclosure.

DETAILED DESCRIPTION

Figure 1:
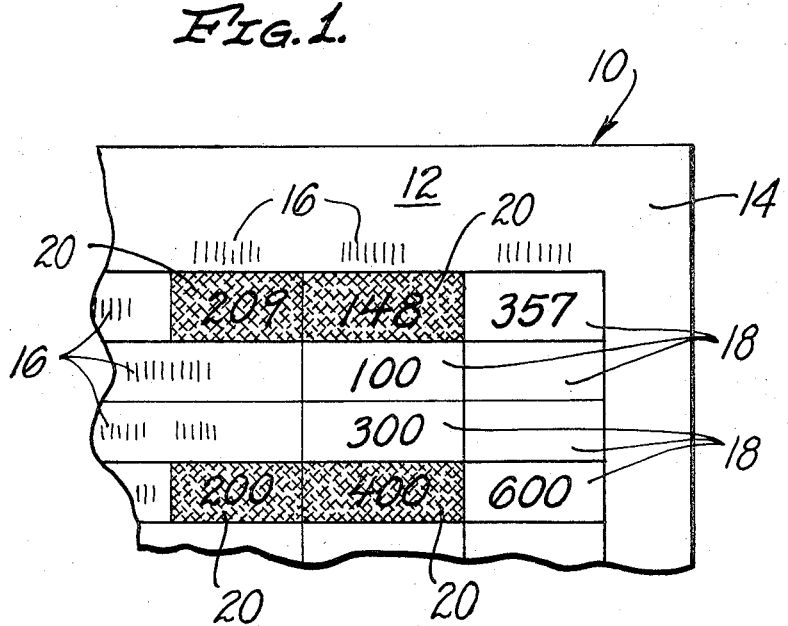
FIG. 1 is a partial view of a simulated preferred embodiment of record form in accordance with this invention.

In FIG. 1 of the drawing there is shown a form 10 of the present invention which is printed upon one side 12 of a conventional sheet of white paper 14. The color of the paper 14 is substantially immaterial to the present invention so long as the surface 12 is of a color which will not reproduce during the use of a copying machine with which the form 10 is to be copied. This surface 12 is printed so as to contain various legends 16 which are pertinent to the nature of the form 10 and various areas 18 and 20 as shown which are adapted to be written, typed or printed upon so as to contain writings such as the numerals shown in these areas. The printing used in creating the legends 16 and in delineating the areas 18 and 20 is preferably of a color which will readily reproduce through the use of a copying machine to be used with the form 10.

The interiors of the areas 18 are preferably unprinted as shown in the drawing. The interiors of the areas 20 are preferably printed over with a light colored ink which will reproduce with a conventional copying machine to be used with the form 10. Preferably the printing within the areas 20 is in a form of a pattern of closely spaced non-straight, crossing lines or crosses or the like which will effectively obscure any writing within the areas 20 as the form 10 is copied in such a machine.

Figure 2:
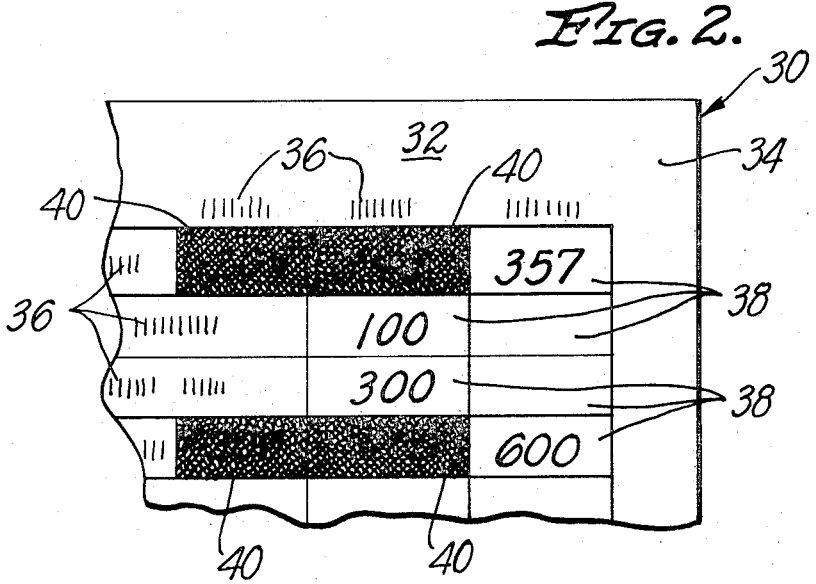
FIG. 2 is a view corresponding to FIG. 1 of a copy made from the form shown in FIG. 1.

As the result of the use of printing on the form 10 as described when a copy is made of the form 10 after this form has been used, such a copy will appear as the copy 30 shown in FIG. 2 of the drawing. This copy will embody on a surface 32 of a sheet 34 legends 36 corresponding to the legends 16 previously described and areas 38 and 40 corresponding to the areas 18 and 20 previously described. Any writings within the areas 38 will be reproduced on this copy 30. However, on this copy 30 any writing within the original areas 20 will be obscured because of the reproduction of the interiors of the areas 20. As a consequence of this, information written within the areas 20 will not be visible in the areas 40.

It is presently preferred that a form 10 of the present invention be created for use with a Xerographic type copying machine. The nature of Xerographic copying processes is indicated in a number of different text authorities. A brief description of Xerographic methods of reproduction is set forth in the text, "The Way Things Work," Volume 1, published by Simon & Schuster, N.Y., N.Y., copyrighted 1967 on pages 424 and 425. For the purpose of amplifying the disclosure embodied herein the content of these pages of this text are incorporated herein by reference.

Such Xerographic type copying normally involves: the creation of an electric charge on the surface of a photo conductive semi-conductor; the subsequent discharge of the charge on selected areas of such a semiconductor in accordance with light reflected from whatever is being copied; the adherence of an electrically charged powder or composition to the remaining charged areas of the semi-conductor; and then the final fusion of such powder to form the image of a copy. Most conveniently such a charged powder is transferred from the semi-conductor to the surface of a piece of paper and then is adhered to the surface of the paper through the use of heat. On occasion, the semiconductor is located upon the surface of a piece of paper and the powder is adhered directly to it to form a final copy.

With this type of reproduction or copying the image created in the final copy is of a single color regardless of whether or not the image copied is in one or more colors. Further, this type of copying is notoriously insensitive to the reproduction of an image which will vary in intensity. Thus a line on a piece of paper being copied which varies from having a light grey appearance to a heavy black appearance will be reproduced by this type of copying process as a single line of a reasonably uniform color and density.

In accordance with this invention these limitations of conventional Xerography are effectively and beneficially utilized. Preferably the areas 20 are created of light yellow-orange colored lines capable of being over printed or over written by a blue or black pencil, a pen, typewriter or the like. In the form 10 any writings created in this manner will be apparent from a visual inspection of the areas 20. In a copy such as the copy 30 of such a form 10 any writings of this type in the areas 20 will be obscured in areas such as the areas 40 because the yellow-orange printing in the areas 20 will reproduce as well as any writings in these areas 20 and because the yellow-orange lines used will reproduce in such a manner as to make it impossible to determine by normal visual examination if there have been any writings in the areas 20.

It is possible to use with the invention other lines than yellow-orange lines as indicated. Such yellow-orange lines are preferred inasmuch as they contrast with the grey shade of normal pencil writing or the blue or black color of normal pen ink or the black of normal typewriter ink so that any writing upon an area such as an area 20 will stand out in such a way as to be readily visible. Lines of other colors which contrast with a normal "writing" (including printing) and which will reproduce in a particular reproduction process may, of course, be employed.

It is preferred to utilize lines in the areas 20 instead of forming these areas 20 of a solid color because Xerographic type reproduction processes are of such a nature as to normally tend to reproduce comparatively massive areas or lines in such a way that the interiors of such areas or lines may tend to be of a less dark or colored character than the outlines of such areas or lines. It is considered that if the areas 20 of the form 10 were of a solid color, such as a solid yellow-orange color, that the reproduction of these areas would not be satisfactory in carrying out the purposes of this invention in obscuring writings in these areas.

I claim:

1. A form which is intended to be reproduced using a Xerographic copying machine and which is intended to contain information which is not reproduced by such a machine when other information on the form is reproduced by such a machine which comprises:

a sheet of paper, one side of which serves as a form for use in recording written information, some of which information is intended to be reproduced and other of which information is not intended to be reproduced, said side being divided into areas to carry that information which is to be reproduced and other areas to carry that information which is not intended to be reproduced, said other areas being covered by a means for permitting written information entered on them to be visually inspected and for obscuring such information when the form is copied using said copying machine, said means comprising a closely spaced pattern of a yellow-orange color extending so as to cover said other areas.

* * * * *